(12) United States Patent
Sima

(10) Patent No.: US 7,647,631 B2
(45) Date of Patent: Jan. 12, 2010

(54) AUTOMATED USER INTERACTION IN APPLICATION ASSESSMENT

(75) Inventor: Caleb Sima, Woodstock, GA (US)

(73) Assignee: Hewlett-Packard Development Company, Houston, TX (US)

( * ) Notice: Subject to any disclaimer, the term of this patent is extended or adjusted under 35 U.S.C. 154(b) by 594 days.

(21) Appl. No.: 11/007,713

(22) Filed: Dec. 7, 2004

(65) Prior Publication Data

US 2005/0132232 A1    Jun. 16, 2005

Related U.S. Application Data

(60) Provisional application No. 60/528,408, filed on Dec. 10, 2003.

(51) Int. Cl.
*H04L 9/00* (2006.01)
*G06F 15/16* (2006.01)

(52) U.S. Cl. ............... 726/22; 726/2; 709/201

(58) Field of Classification Search ........... 726/22
See application file for complete search history.

(56) References Cited

U.S. PATENT DOCUMENTS

| | | | |
|---|---|---|---|
| 4,750,181 A | 6/1988 | McDonald | |
| 5,490,266 A | 2/1996 | Sturges | |
| 6,092,194 A | 7/2000 | Touboul | |
| 6,151,599 A | 11/2000 | Shrader | |
| 6,185,689 B1 | 2/2001 | Todd | |
| 6,253,326 B1 | 6/2001 | Lincke | |
| 6,314,425 B1 | 11/2001 | Serbinis | |
| 6,324,647 B1* | 11/2001 | Bowman-Amuah | 726/23 |
| 6,453,345 B2* | 9/2002 | Trcka et al. | 709/224 |
| 6,550,012 B1* | 4/2003 | Villa et al. | 726/11 |
| 6,584,569 B2* | 6/2003 | Reshef et al. | 726/25 |
| 6,618,806 B1 | 9/2003 | Brown | |
| 6,636,972 B1 | 10/2003 | Ptacek | |
| 6,714,931 B1 | 3/2004 | Papierniak | |
| 6,785,732 B1 | 4/2004 | Bates | |
| 6,981,246 B2* | 12/2005 | Dunn | 717/127 |
| 7,100,199 B2* | 8/2006 | Ginter et al. | 726/4 |
| 2002/0042882 A1 | 4/2002 | Dervan | |
| 2002/0066023 A1 | 5/2002 | McIlroy | |
| 2002/0066028 A1 | 5/2002 | Welborn | |
| 2002/0129264 A1 | 9/2002 | Rowland | |

(Continued)

FOREIGN PATENT DOCUMENTS

CA    2428648 A1    7/2004

(Continued)

OTHER PUBLICATIONS

J. I. Hong, J. Heer, S. Waterson and J. A. Landay, WebQuilt: A Proxy-based Approach to Remote Web Usability Testing, ACM Transactions on Information Systems, 19(3): 263-285, Jul. 2001.*

(Continued)

*Primary Examiner*—Greta L Robinson
*Assistant Examiner*—Brian E Weinrich

(57) ABSTRACT

Various embodiments of systems, methods, software tools, etc. for performing an assessment of an application are provided. One embodiment comprises a method for performing an assessment of a web application. One such method comprises: recording user interactions with a web application; and playing back the user interactions to perform an assessment of the web application.

21 Claims, 11 Drawing Sheets

U.S. PATENT DOCUMENTS

| | | |
|---|---|---|
| 2002/0147915 A1 | 10/2002 | Chefalas |
| 2003/0070003 A1 | 4/2003 | Chong |
| 2003/0126472 A1 | 7/2003 | Banzhof |
| 2003/0140250 A1 | 7/2003 | Taninaka |
| 2003/0159063 A1 | 8/2003 | Apfelbaum |
| 2003/0233581 A1 | 12/2003 | Reshef |
| 2004/0019803 A1 | 1/2004 | Jahn |
| 2004/0039827 A1 | 2/2004 | Thomas |
| 2004/0049596 A1 | 3/2004 | Schuehler |
| 2004/0148281 A1 | 7/2004 | Bates |
| 2004/0153508 A1* | 8/2004 | Alcorn et al. ............... 709/205 |
| 2005/0021809 A1* | 1/2005 | Zhu et al. .................. 709/231 |
| 2005/0027990 A1* | 2/2005 | Ogawa ....................... 713/184 |
| 2007/0061877 A1* | 3/2007 | Sima et al. ................... 726/12 |

FOREIGN PATENT DOCUMENTS

| | | |
|---|---|---|
| EP | 0770958 A1 | 5/1997 |
| JP | 2004072367 A * | 3/2004 |

OTHER PUBLICATIONS

V. Anupam, J. Freire, B. Kumar and D. Lieuwen, Automating Web Navigation with the WebVCR, Computer Networks, 33(1-6): 503-517, Jun. 2000.*

* cited by examiner

AUTOMATED USER INTERACTION IN APPLICATION ASSESSMENT

CROSS-REFERENCE TO RELATED APPLICATION

This application claims the benefit of U.S. Provisional Application Ser. No. 60/528,408, entitled "System and Method for Recording and Reusing User Interactions with a Web Application," filed on Dec. 10, 2003, which is hereby incorporated by reference in its entirety.

BACKGROUND

Security and the protection of digital assets is a key enabler of our information-driven economy. The information security industry has evolved from a niche corner of information technology to something that pervades the industry itself. Despite this increased attention to security, the complexity of information systems and the reliance upon them creates a fragility that adds up to risk to organizations of all sizes. Vulnerabilities are inherent in nearly everything, and computer systems are no exception. Software vulnerabilities have many different origins. For instance, in some cases, a coding standard can be poorly written, causing all software written to these specifications to be faulty.

Bugs are an inevitable reality of the software development process, and some of these bugs can create serious vulnerabilities. Additional vulnerabilities may be introduced when a system is installed, configured, and customized for individual use. In general, any stage during the software development and usage lifecycles creates risk for the introduction of vulnerabilities. Some vulnerabilities are innocuous and some can be critical in nature. Identifying the key risks and their solutions is one of the most critical aspects of information security.

Research has historically shown that successful malicious penetrations upon computer systems and well known worms and viruses have been based upon known vulnerabilities. Vulnerabilities may exist at any aspect of computing systems. For instance, vulnerabilities may exist in typical desktop applications and/or operating systems, network layer components, etc. Furthermore, vulnerabilities may exist at the application layer, which may include weaknesses created by the integration of one or more application components, including in-house custom programming, operating systems, databases, web pages, and middleware. These vulnerabilities are potentially unique to each integrated system and can be added and removed dynamically with each change to any system component.

Currently, there are various vulnerability assessment solutions that enable IT professionals to proactively address vulnerabilities at various aspects of computing systems, including network layer, application layer, etc. By way of example, various tools exist for identifying security vulnerabilities in computing systems. Anti-virus tools exist for determining desktop vulnerabilities in applications, operating systems, etc. Within the web application space, various assessment tools also exist, which may employ various heuristics to identify vulnerabilities in web applications. Typically, web application assessment tools have the ability to identify dynamic "unique" vulnerabilities using adaptive and behavioral techniques, as well as standard "static" vulnerabilities. Web application assessment tools may map an entire web system, including all links, proprietary code, connections to data sources, etc.

Despite the existence of various types of proactive tools for assessing vulnerabilities in computing systems, there is a need for improved systems, methods, software, etc. for performing application assessment.

SUMMARY

Various embodiments of systems, methods, software tools, etc. for performing an assessment of an application are provided. One embodiment comprises a method for performing an assessment of a web application. One such method comprises: recording user interactions with a web application; and playing back the user interactions to perform an assessment of the web application.

Another embodiment comprises a web application assessment system. One such system comprises: a user interaction recorder for capturing interactions between a browser and a web application; and a playback tool for receiving the captured interactions and automatically repeating the captured interactions for performing an assessment of the web application.

A further embodiment comprises an application assessment system. One such system comprises: means for capturing user interactions between a user interface and an application; and means for automatically repeating the captured interactions for performing a security assessment of the application.

Yet another embodiment comprises a web application vulnerability assessment system. One such system comprises: a recorder that interfaces with a web browser to capture interactions between the web browser and a web application being accessed by the web browser; and a web application assessment agent for automatically repeating the captured interactions during a vulnerability assessment of the web application.

DETAILED DESCRIPTION

Various embodiments of systems, methods, software tools, etc. are provided for performing a vulnerability assessment of a computer application. It should be appreciated that the vulnerability assessment may be configured to test for various types of vulnerabilities related to various types of applications. In this regard, the term "application" should be interpreted to include any computer application or component thereof, including custom programming, operating systems, databases, web applications, web-based applications, web pages, and middleware, to name a few. Various embodiments are described below with respect to FIGS. 1-12. As an introductory matter, however, an exemplary embodiment of a web application assessment system will be briefly described.

The exemplary web application assessment system provides a convenient mechanism for automating certain aspects of the assessment process. In general, the web application assessment system tests a web application for various known vulnerabilities based on predefined vulnerability criteria. For example, the web application assessment system may test for vulnerabilities by automatically controlling browser activity with the web application. In other words, the web application assessment system simulates/performs browser interactions corresponding to vulnerabilities in the web application. The exemplary web application assessment system includes a mechanism for recording user interactions between the browser and the web application. The recording mechanism enables various vulnerabilities to be tested in real-time and automatically repeated via a playback mechanism. In this manner, the recording mechanism may be used to capture desirable assessment procedures and automatically play back the user interactions for subsequent assessments.

Figure 1:
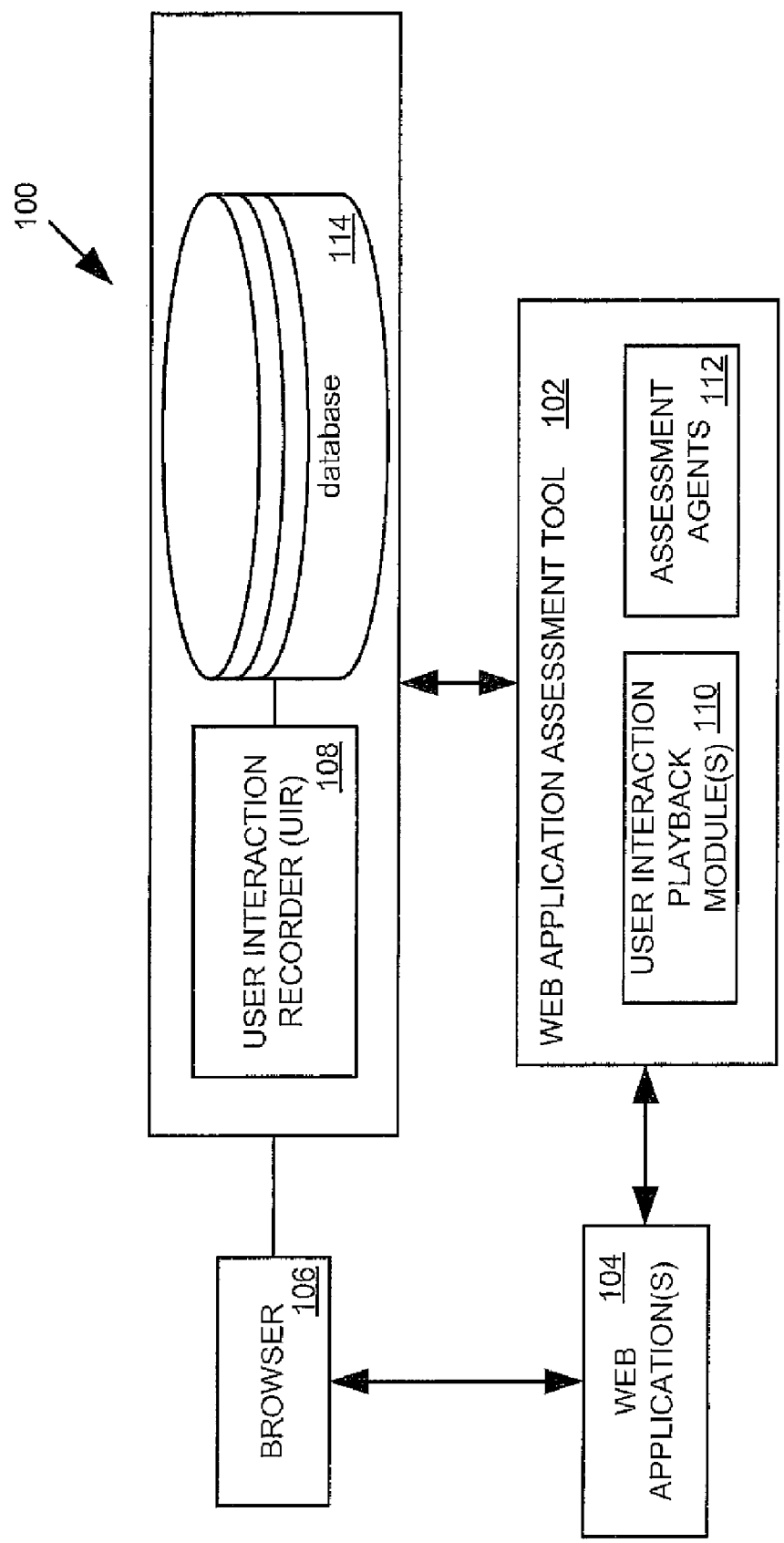
FIG. 1 is a block diagram illustrating one embodiment of a web application assessment system.

FIG. 1 illustrates a web application assessment system (WAAS) 100 for recording and playing back browser interactions corresponding to potential vulnerabilities. WAAS 100 comprises a web application assessment tool 102 for assessing potential vulnerabilities associated with web application(s) 104. As illustrated in FIG. 1, WAAS 100 comprises a user interaction recorder (UIR) 108 associated with a browser 106 and user interaction playback module(s) 110 which may be integrated with assessment tool 102. As known in the art, assessment tool 102 may include various software agents (e.g., assessment agents 112) for performing the assessment on web application(s) 104. As described in more detail below, UIR 108 provides the logic, functionality, etc. for recording user interactions with web application(s) 104 as they are performed via browser 106.

In this regard, it should be appreciated that an operator may desire to flexibly configure assessment tool 102 to perform certain vulnerability assessments. For instance, the operator may perform various user interactions with a web application 104 via browser 106. As the user interactions are performed (which relate to the target vulnerability to be tested), the operator may selectively control which user interactions are to be recorded via UIR 108 by starting and/or stopping the recording process (e.g., via a user menu). WAAS 100 may include a database 114 for storing relevant user interactions. Rather than manually perform the user interactions each time assessment tool 102 performs an assessment, user interaction playback module(s) 110 enable the user interactions to be automatically repeated. Furthermore, UIR 108 and user interaction playback module(s) 110 enable an operator to conveniently define relevant user interactions, capture the user interactions as they are performed via browser 106, and replay the user interactions during subsequent assessments.

Figure 2:
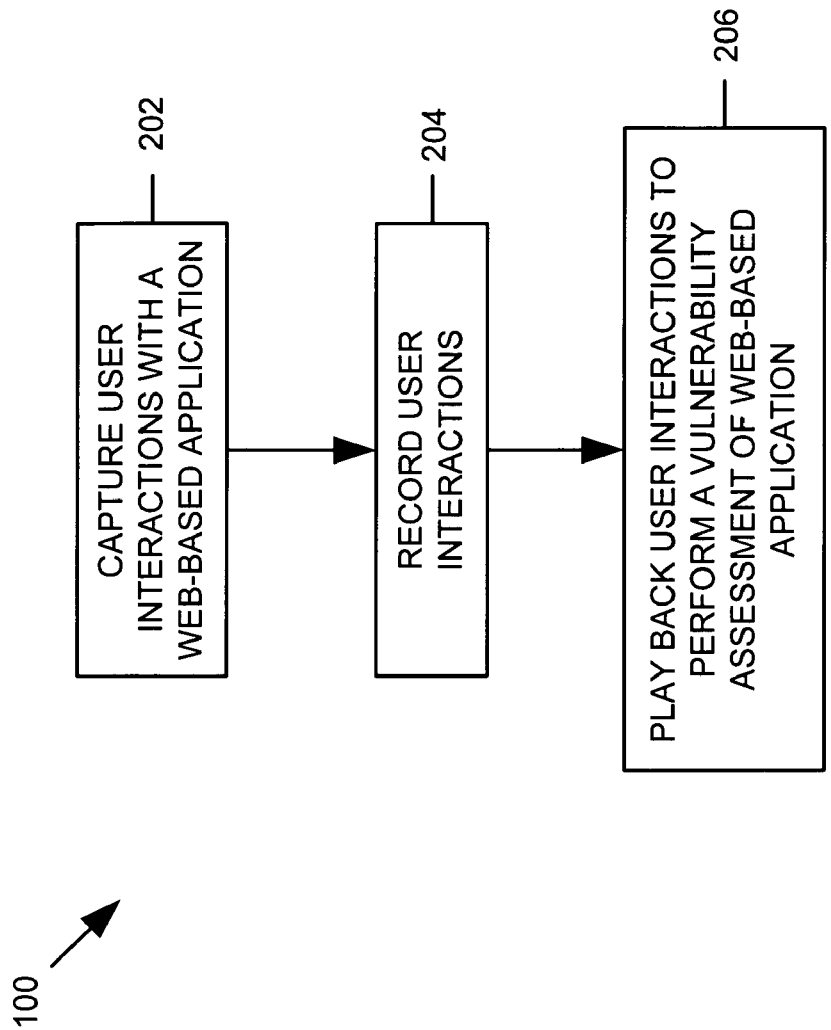
FIG. 2 is a flowchart illustrating the general operation of the web application assessment system of FIG. 1.
Figure 3:
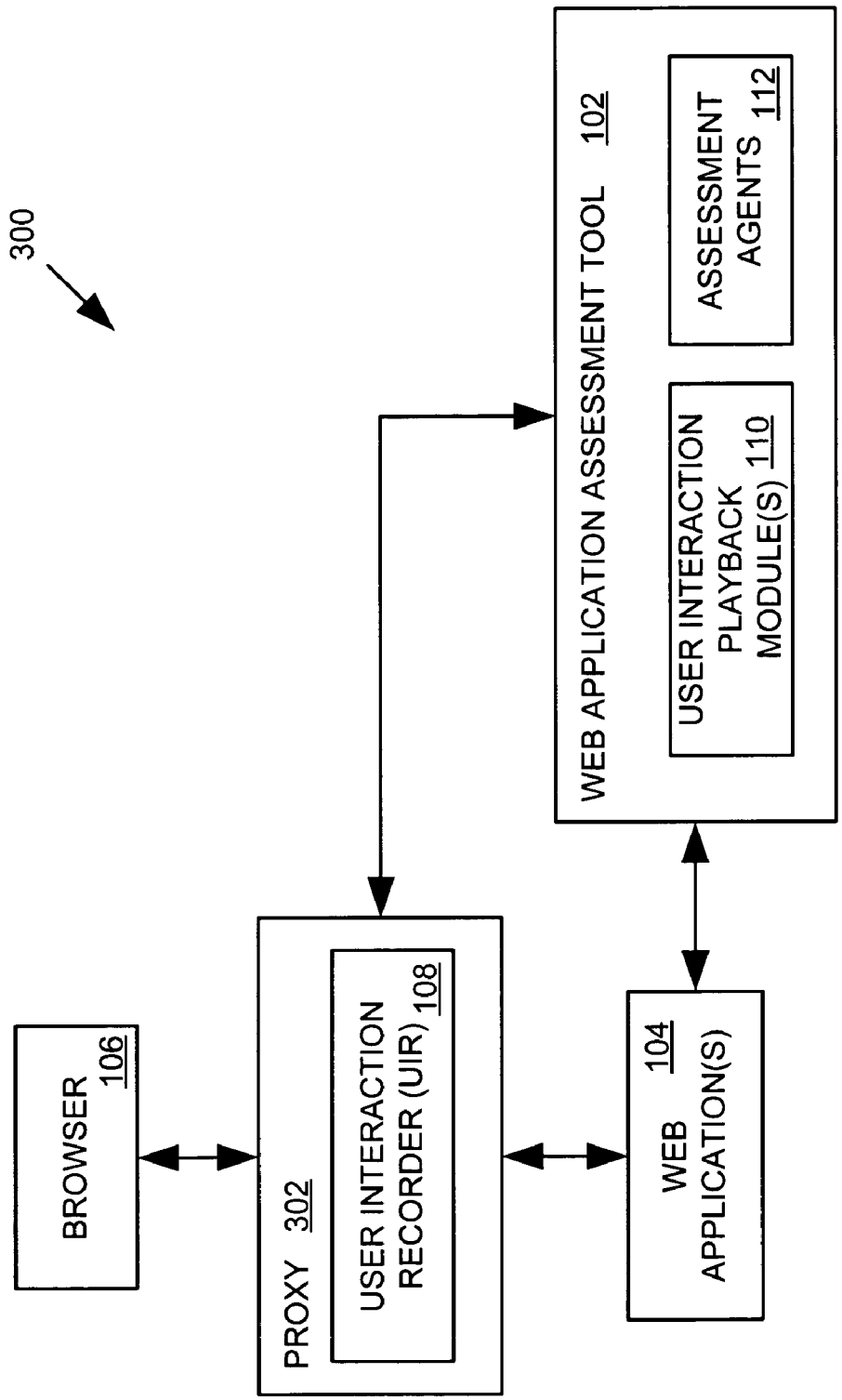
FIG. 3 is a block diagram illustrating another embodiment of a web application assessment system.

FIG. 2 illustrates one of a number of embodiments of a method for performing a web application vulnerability assessment. At block 202, WAAS 100 captures user interactions with web application 104 as they are performed via browser 106. At block 204, WAAS 100 may record the user interactions. In some embodiments, WAAS 100 may store the user interactions in database 114. At block 206, WAAS 100 plays back (or otherwise repeats) the user interactions to perform a vulnerability assessment of web application 104. The user interactions may be repeated for the same application at another time or a different web application.

Figure 4:
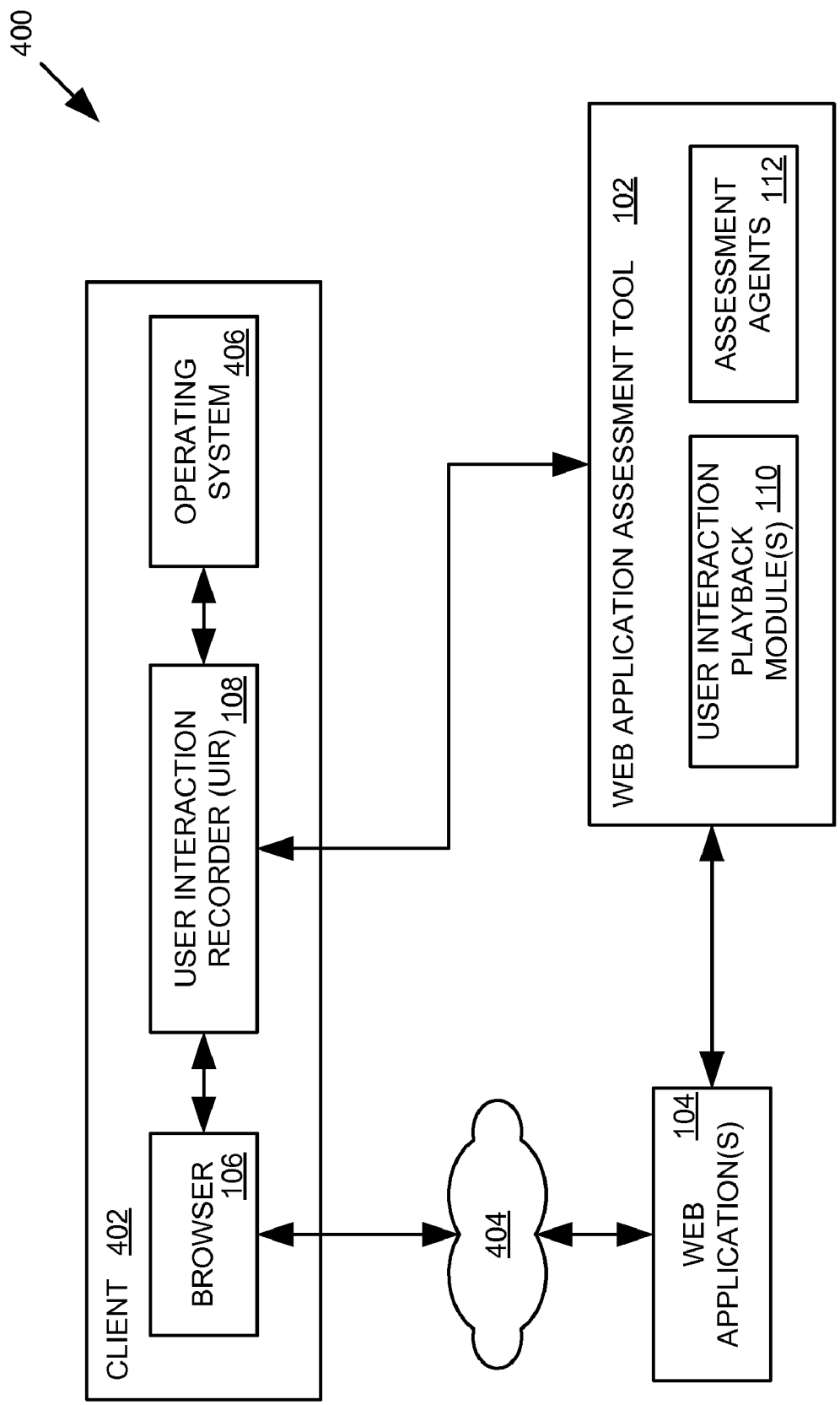
FIG. 4 is a block diagram illustrating a further embodiment of a web application assessment system.

It should be appreciated that UIR 108 and user interaction playback module(s) 110 may be implemented in a number of ways. For example, UIR 108 and/or browser 106 may be integrated with web application assessment tool 102 or provided as separate functionality which are leveraged by assessment tool 102. UIR 108 may be implemented in various ways to record, capture, obtain, etc. user interactions with web application 104 via browser 106. In the embodiment illustrated in FIG. 3, UIR 108 is implemented with a network proxy 302. For example, in this embodiment, the user interacts with a web browser (or web-based program) in the manner that a user would without a proxy, but the program then makes normal requests and pipes them through the proxy. In alternative embodiments, such as the one illustrated in FIG. 4, UIR 108 may be implemented on the same client 402 where browser 106 is located. For example, UIR 108 may be configured as a browser plug-in, browser helper object, etc. As illustrated in FIG. 4 and described in more detail below, UIR 108 leverages an operating system functionality which intercepts relevant O/S calls and thereby captures the browser interactions with web application 104.

Figure 5:
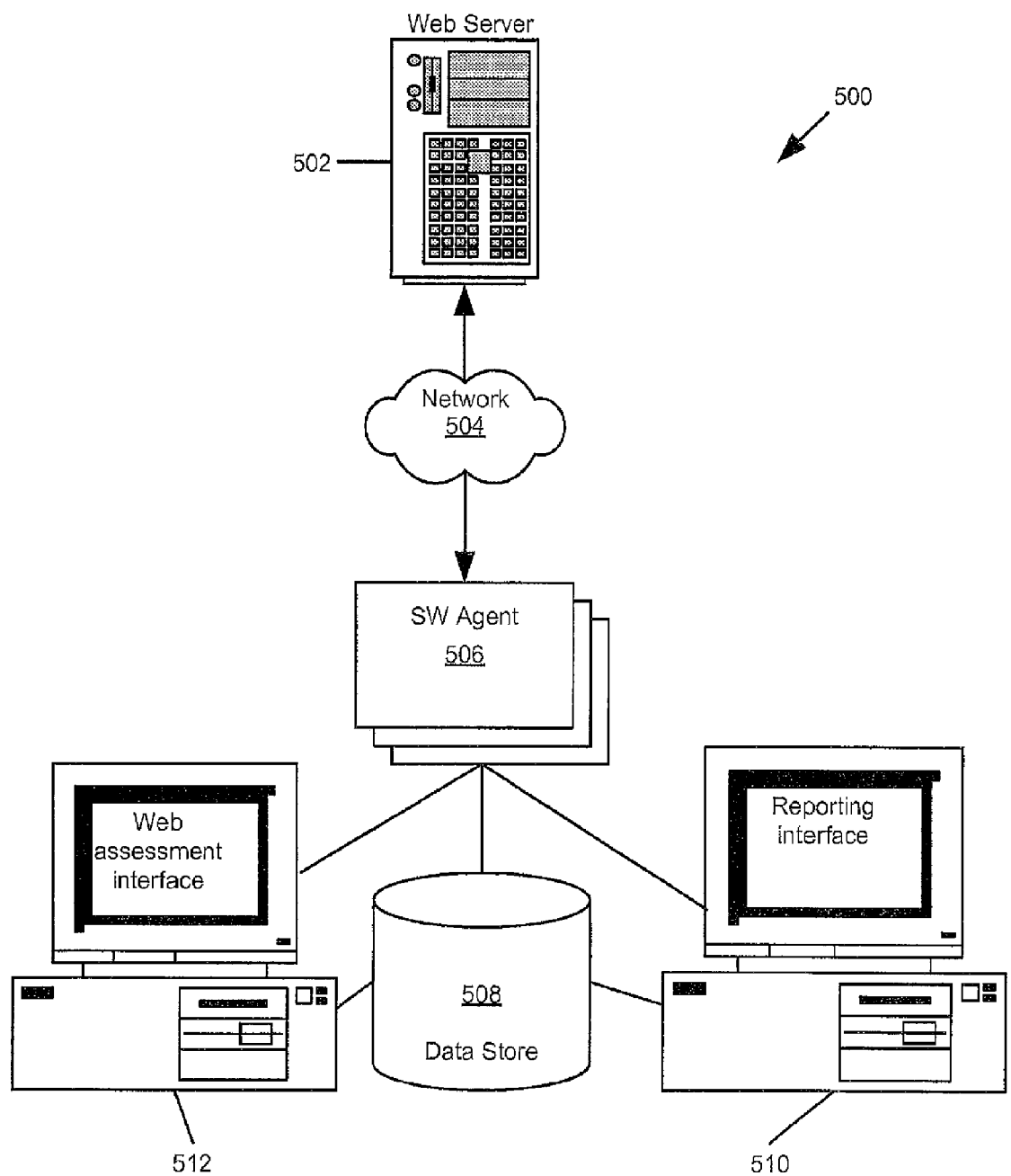
FIG. 5 is a block diagram illustrating a further embodiment of a web application assessment system.

It should be appreciated that various types of assessment tools may leverage the functionality of UIR 108 and user interaction playback module(s) 110. FIG. 5 illustrates an embodiment of a web application assessment system 500 in which these components may be implemented. Through the web assessment interface 512 an operator may designate which application or web service is to be analyzed. The operator may select which type of assessment to run, as well as which policy to use for each web application assessment. Web application assessment system 500 uses software agents 506 to conduct the web application assessment on, for example, a web server 502 via communications network 504. Software agents 506 may comprise sets of heuristics that enable the tool to apply intelligent application-level vulnerability checks and accurately identify security issues while minimizing false positives. Web application assessment system 500 may employ a crawl phase of the application using software agents to dynamically catalog all areas. As these agents complete their assessment, findings may be reported back to a main security engine to analyze the results. Web application assessment system 500 may launch additional software agents 506 during another phase (e.g., audit phase) which evaluates the gathered information and applies attack algorithms to determine the presence and severity of vulnerabilities. Web application assessment system 500 may also correlate the results and present them in an easy to understand format via reporting interface 510. As illustrated in FIG. 5, web application assessment system 500 may include a data store 508 that includes various forms of data related to the assessment.

Figure 6:
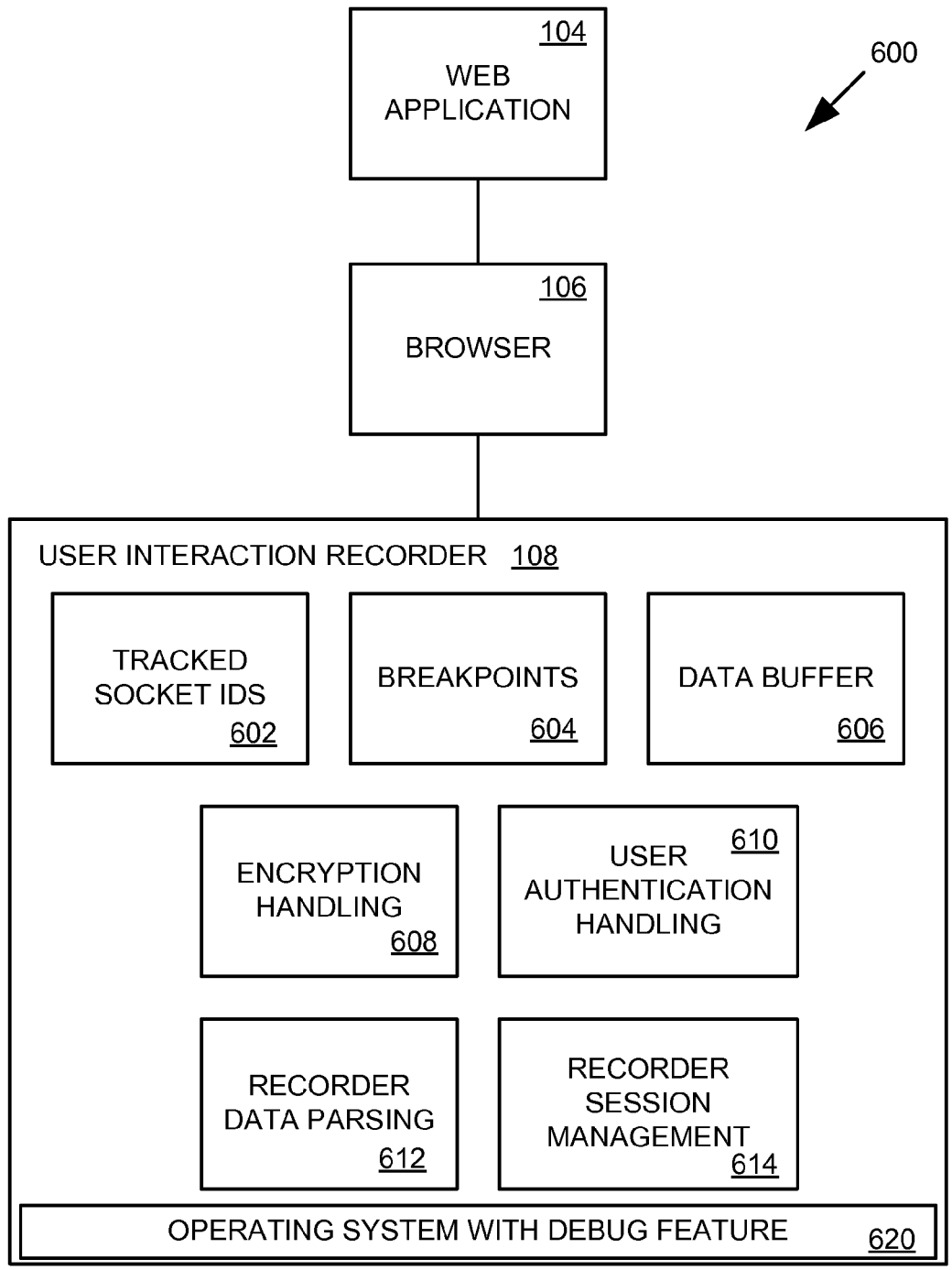
FIG. 6 is a block diagram illustrating one of a number of embodiments of the user interaction recorder of FIGS. 1, 3, and 4 for recording user interactions with a web application.

Referring to FIGS. 6-12, various additional embodiments of a UIR 108 will be described. It should be appreciated that, in one embodiment, UIR 108 may be configured as a socket recorder. FIG. 6 illustrates an embodiment of UIR 108 implemented as a socket recorder. A socket is a basic method used by a computer program to communicate over a network. The data moving through a socket is normally only available to the program that created the socket. A socket recorder acts like a 'wire-tap' on a program that uses sockets. Unlike a telephone wire-tap, the recorder can manipulate the data before allowing it to pass. In the embodiment illustrated in FIG. 6, UIR 108 comprises various mechanisms for facilitating the recording process: tracked socket IDs 602; breakpoints 604; a data buffer 606; encryption handling 608; user authentication handling 610; recorder data parsing 612; and recorder session management 614.

As mentioned above, UIR 108 may employ an operating system functionality to record the user interactions 620. For instance, in embodiments where browser 106 operates on a machine running a Windows operating system, the Microsoft debug API 620 may be leveraged for this purpose. The Microsoft debug API is a set of operating system functions that can be applied to any program running on the operating system. UIR 108 may use these functions to tap into the program, as well as data within browser 106. While this description focuses on Windows operating systems, it will be understood that other operating systems may include analogous APIs for enabling similar functionalities. In addition, while the description will refer to a browser as the target program for the recorder, it will be understood that any program that uses the network, such as e-mail, instant messaging, and other network applications, could be substituted.

Figures 7, 8:
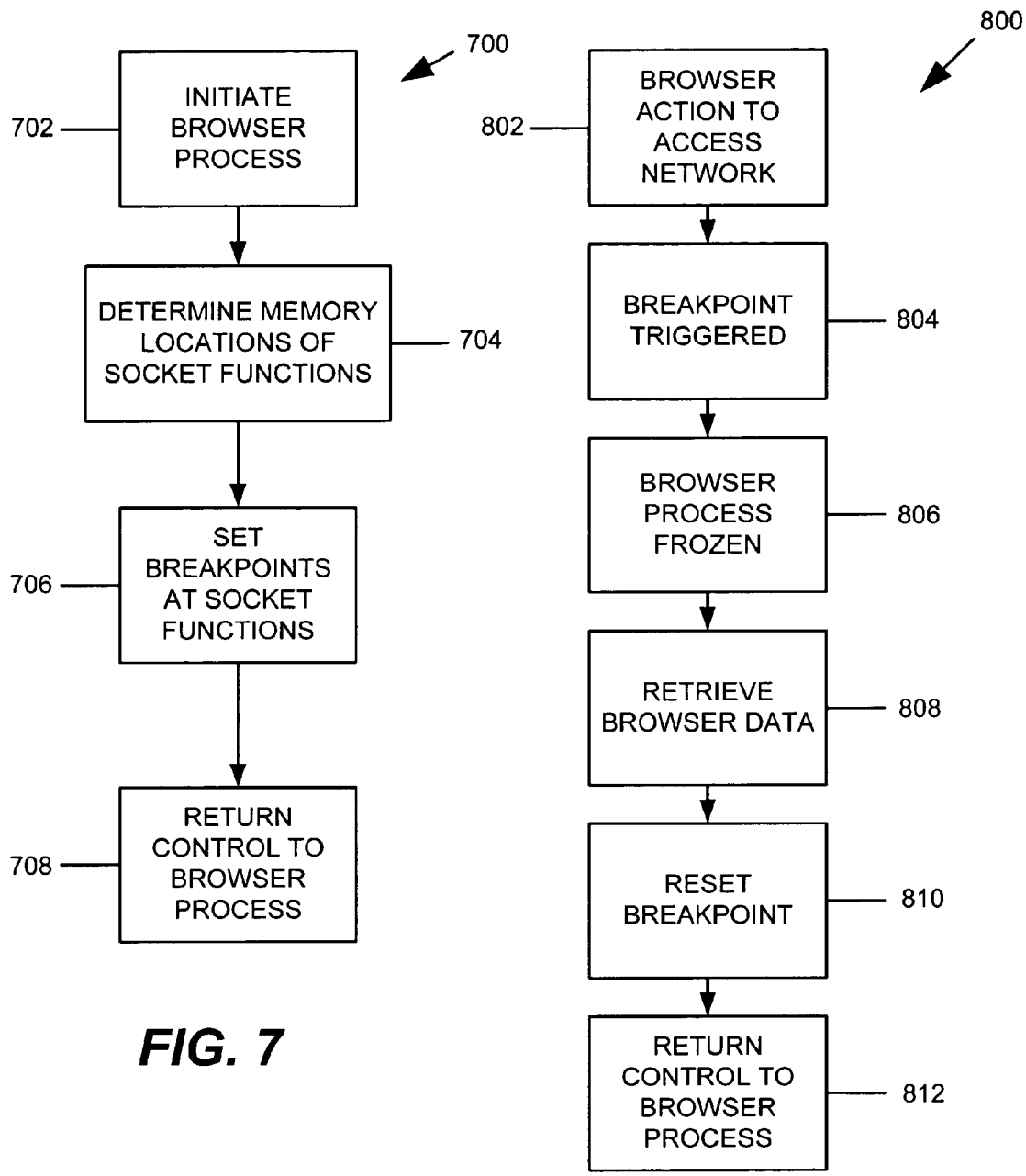
FIG. 7 is a flow diagram of one embodiment of a method for initiating web socket monitoring.
FIG. 8 is a flow diagram of an embodiment of a method for recording browser/web server communications.

Referring to FIG. 7, an embodiment of a method implemented by UIR 108 for initiating web socket monitoring will be described. At block 702, UIR 108 creates the browser process by launching the user's default web browser (e.g., browser 106). Because UIR initiates the process, the operating system considers the recorder to be the 'owner' of the process, so the OS will allow the recorder to meddle in the browser's functioning.

Windows programs normally use the WinSock (sockets for windows) functions to access the network. At block 704, UIR 108 probes the recently launched browser to determine where some of the winsock functions reside (memory address) within the browser's memory space. When the functions have all been located, at block 706, UIR 108 uses the debug API to set a 'breakpoint' (e.g., breakpoint 604—FIG. 6) at the start of each of the functions. As illustrated at block 708, UIR 108 may return control to the browser process.

FIG. 8 illustrates an embodiment of a method implemented by UIR 108 for recording browser/web server communications. When the user does something that causes the browser to access the network (block 802), functions within the WinSock library may be used. If a function that UIR 108 is monitoring is used, the breakpoint will be 'hit' or triggered (block 804). The debug API takes control when a breakpoint is hit because UIR 108 is listed as the owner of the browser. The debug API may alert UIR 108 to the breakpoint incident. Then, as illustrated at block 806, the browser is 'frozen' and does not perform any further processing. UIR 108 now has an opportunity to probe the browser. After UIR 108 has retrieved whatever information was needed at block 808, UIR 108 may set a new breakpoint (block 810). As illustrated at block 812, when UIR 108 has finished probing the browser, control may be returned to the browser. It should be appreciated that this method may be implemented without altering the functionality of the browser. Furthermore, the method may be employed in such a manner that the browser is not even aware of the existence of UIR 108. From the user perspective, the method may be implemented in a seamless fashion.

A typical event sequence for communication between a browser and a web server is illustrated below:

(1) socket: request a communication resource from the OS; return a socket ID;
(2) connect: initiate communication with the web server using a socket ID;
(3) send: transmit a request to the server using a connected socket and data;
(4) recv: receive data, if any, from the server using the connected socket; return data;
(5) close: end communication and release resource using a socket.

Web server software may also allow for multiple send and receive steps during a communication session. Since a group of requests and their corresponding responses will occur on one connection, and a connection originates on a socket, the OS assigned socket can be used by UIR 108 to uniquely identify a communication session. With a unique ID, all data sent or received during a session can be kept together for later decoding or parsing when it is certain that there won't be any more data added to the session.

When the browser calls socket( ), UIR 108 determines the address to which control will be returned when the socket call finishes. The address may be stored on the stack, and can be found by retrieving the contents of the CPU's stack register. Once the return address is known, a breakpoint is stored at that address. Before the browser can resume operation, the current breakpoint may be replaced with the original program code that was overwritten when the breakpoint was set, but the breakpoint should be maintained at that location. First, the original program code may be written back into the browser. Next, the CPU's "single-step" option may be enabled. Browser operation is resumed, but ends when a single program instruction has completed. UIR 108 may be reactivated, but the debug API informs it that the reason is that a "single-step" operation has completed. Now that the browser's execution point has moved away from the former breakpoint's location, the breakpoint can be restored. Browser execution resumes and proceeds normally, until the function return breakpoint is reached. When UIR 108 regains control, the result of the sockets( ) function call can be retrieved from the browser. The code overwritten by this breakpoint is then restored, but this breakpoint's information can be discarded. Browser execution is allowed to again proceed normally. All breakpoints are handled in approximately this fashion, and the steps will not be listed again.

The next step in the communication sequence would be to use the connect function to connect the browser to the web server using the socket. When the browser attempts that connection, UIR 108 again receives control over the browser, and fetches the socket identifier. If the ID is one of the socket IDs that are being tracked (tracked socket IDs 602—FIG. 6), the connection parameters are retrieved. The return breakpoint for this function is set when connect( ) returns the success or failure status of the connection attempt is known.

The connected socket is used to send to and receive data from a web server. In accordance with HTTP protocol, the browser may send a request. The browser will eventually call the send WinSock function. When this breakpoint is reached, the socket ID is first read and matched to one of the socket IDs that the recorder is tracking. If a match is made, the data that is about to be sent is retrieved and stored with its associated socket within UIR 108. UIR 108 does not bother to set a return breakpoint for the send function call, and control is returned to the browser. When multiple requests are made using the same socket, the subsequent requests are simply appended to the stored data-creating a list.

When the OS informs the browser that there is data available to be received by the browser, the recv breakpoint is reached. Here, the recorder must determine where recv( ) will store the data and the destination location is read from the stack. The size of the destination area is also read from the stack. A return breakpoint is set, and when recv( ) finishes, the result code is checked to determine whether recv( ) succeeded or failed. If the code indicates success, UIR 108 uses a debug API function to read in the entire data buffer that recv( ) filled with data received from the server. If for some reason recv( ) failed, the data is discarded. If multiple requests were made, multiple responses may be returned by the server, either by one recv( ) invocation, or several. In both cases, the received data is appended to the receive data buffer associated with the socket that the data was received with.

Eventually the browser will close a socket. When this happens, the socket being closed is checked by UIR 108. When a socket is closed, no further data can be sent or received using that socket, so the data can be tested and parsed into individual request and response pairs. The pairs are forwarded to the automated tool. Since sockets are unique within the OS, a browser can open as many sockets as it finds necessary, and UIR 108 is able to independently track all of them.

In embodiments where the browser uses secure communications (e.g., SSL), sent and received data may be encrypted to prevent interception and utilization by potentially hostile outside parties. Since UIR 108 is, from the browser's perspective, a third party, the data is gibberish. However, UIR 108 has control over when the browser performs its tasks. Because data encryption is one of those tasks, UIR 108 may intercept the data before it is encrypted. In most recent versions of Windows, a function called CryptEncrypt is used to encrypt data before it is sent. In certain embodiments, UIR 108 may leverage this functionality.

When the encrypt function is reached, the un-encrypted data is read and stored by UIR 108. A return breakpoint is set to allow UIR 108 to get a sample of the encrypted data. The encrypted data that the sample was taken from will eventually be sent by the browser. The sample is used to associate the socket sending the encrypted data with the non-encrypted text. The browser sends encrypted data without interference and SSL communications proceed normally, though UIR 108 will display the plain text communication.

Encrypted received data may be handled similarly. A sample of the data is stored until the browser attempts to decrypt some of the received data. Each time CryptDecrypt (or similar functionality) is called, a sample of that data is collected and matched to one of the receive data buffers stored by UIR 108. When the decryption is complete, the decrypted data is read and replaces the encrypted data stored by UIR 108.

Figure 9:
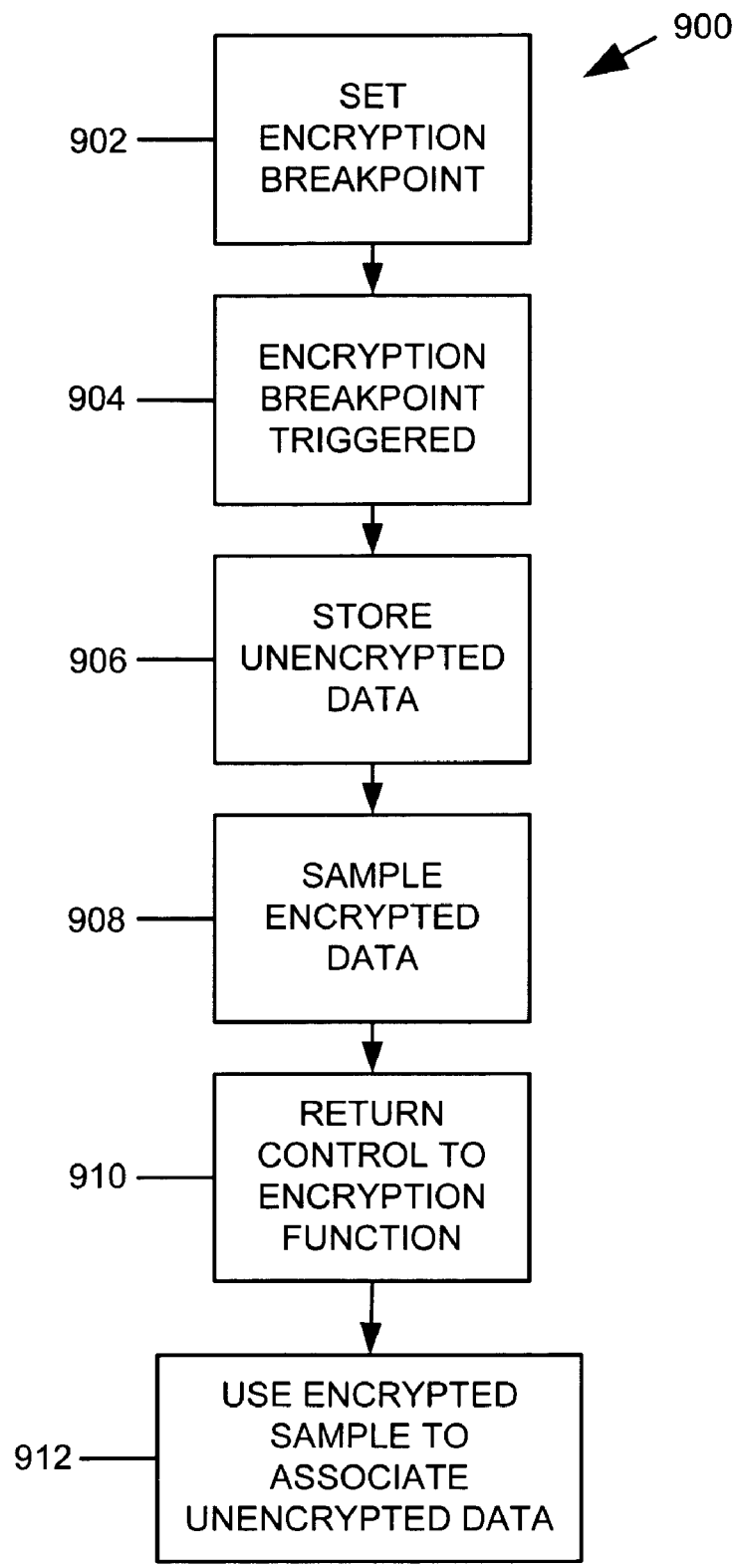
FIG. 9 is a flow diagram of an embodiment of a method for recording encrypted browser/web server communications.

FIG. 9 illustrates another embodiment of a method 900 implemented by UIR 108 for recording encrypted browser/web server communications. Initially the encryption breakpoint is set 902. When the encryption breakpoint is triggered 904, the unencrypted data is stored 906. The encrypted data is then sampled 908 and control is returned to the encryption function 910. The encrypted sample is used to associate unencrypted data 912.

Figure 10:
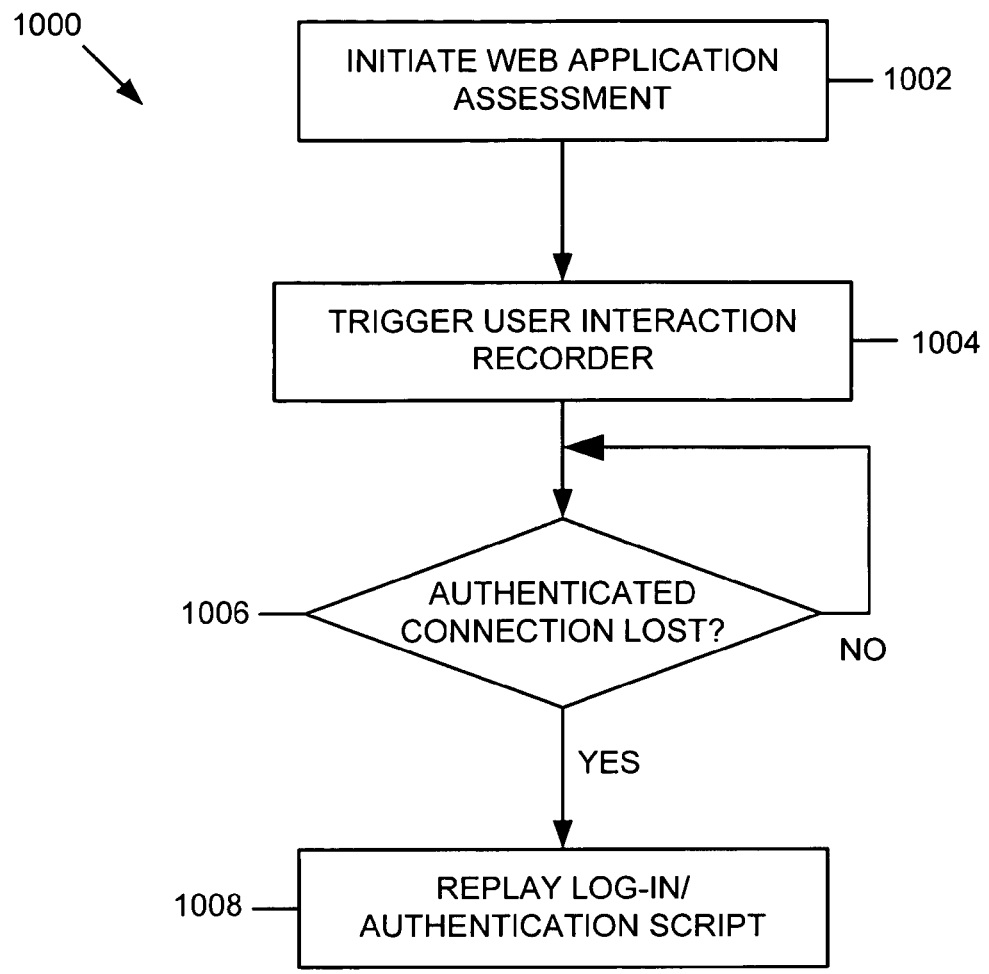
FIG. 10 is a flow chart illustrating an embodiment of a method for automatically re-establishing an authenticated connection during a web application assessment.

In additional embodiments, UIR 108 may be configured to automate a browser log-in procedure or other authentication procedure used to access web application(s) 104. UIR 108 provides a convenient mechanism for recording the authentication procedures and automatically repeating them in the event that the authenticated connection is lost. FIG. 10 illustrates an embodiment of a method 1000 for automatically re-establishing an authenticated connection during a web application assessment. At block 1002, the web application assessment process is initiated and, at block 1004, UIR 108 begins recording user interactions. During the assessment procedure, the user may be required to log-in or otherwise perform an authentication procedure to access the web application. UIR 108 captures the appropriate authentication procedure and stores it as an authentication script. As illustrated at decision block 1006, if during the web application assessment the authenticated connection is lost, at block 1008, the authentication script may be automatically accessed and replayed to re-establish the connection with the web application.

As known in the art, some networks require authentication via the NTLM protocol. This protocol requires a user name and password. Normally, a logon would require an automated tool to prompt a user to provide the credentials, negating any automation improvements. The credentials could also be pre-stored within the automated tool, though that is at best a credential management nuisance, because a person would have to update yet another password when their network password changes. At worst, a password stored in that fashion is a security risk. UIR 108 improves on both techniques by monitoring two functions used by during network authentication, InitializeSecurityContext and AcquireCredentialsHandle. Monitoring these two functions allows UIR 108 to collect the complete authentication credentials without any nuisance to the user.

Figure 11:
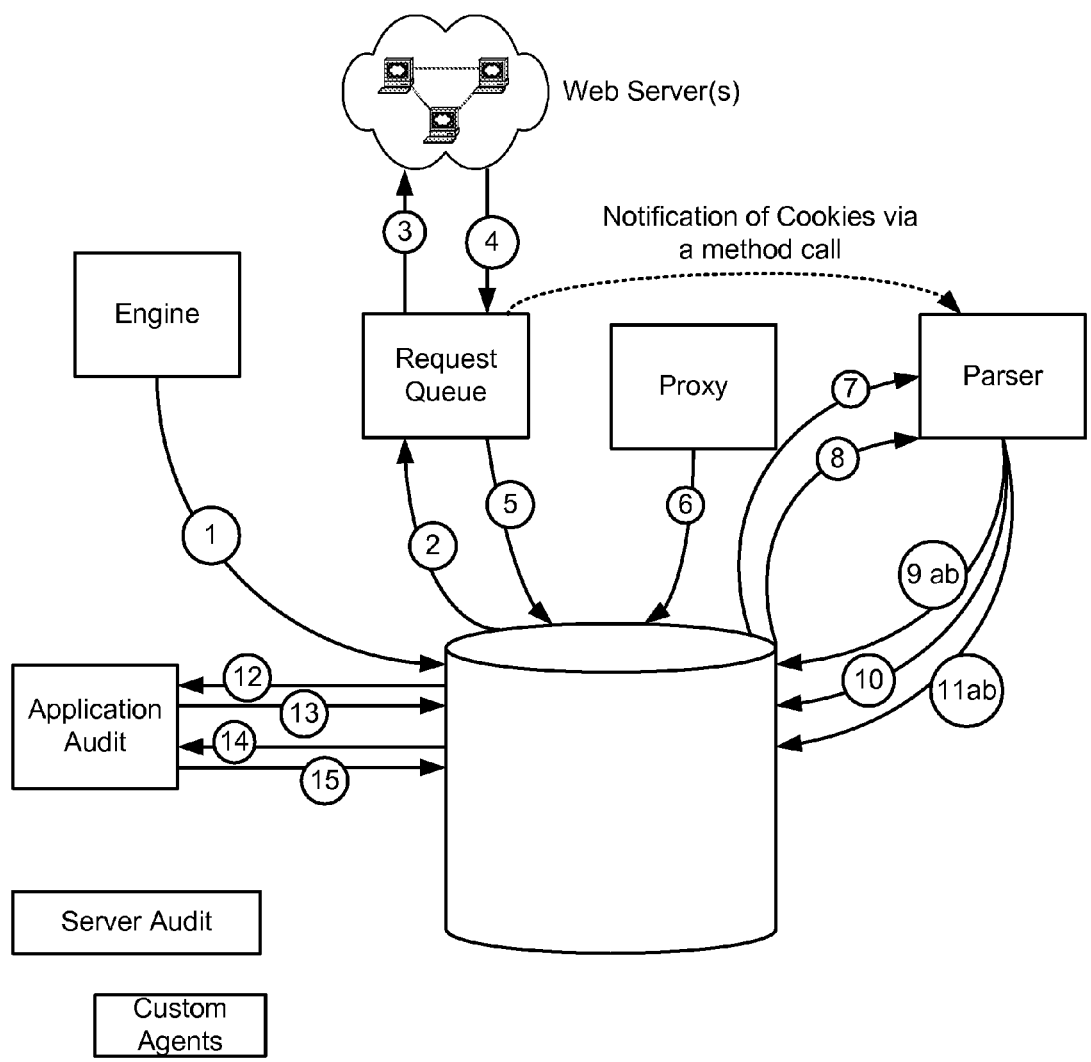
FIG. 11 is combined flow diagram and block diagram illustrating another embodiment of a web application assessment system in which the user interaction recorder may be implemented.

As mentioned above, UIR 108 and user interaction playback module(s) 110 may be used to record and automatically repeat user interactions for any application. In one embodiment, UIR 108 and user interaction playback module(s) 110 are incorporated with a web application assessment tool. FIG. 11 illustrates an embodiment of a web application assessment tool. The components/operation are summarized below.

Crawl/Proxy:
1. Engine will insert initial seed Request into Sessions Table. Also, a 404 request needs to be sent to save time later. This is the random number based 404 check.
2. Request Queue will ask for all UnSent Requests
3. Request will be sent Async
4. Response comes back Async
5. Save method is called on RequestQueueSession object.
6. (Optional) Proxy can insert Session that are proxied Parse:
7. Unparsed Session are retrieved
8. Get the cookies for a session from the Data Layer
9a. Add Sessions where links are found
9b. Add Hidden URL's as simple string. Will be used later.
10. Add SetCookies
11a. Session is updated with parsed Session (including Vulnerabilities)
11b. 404 page is updated Application Audit:
12. Audit get's all sessions w/o 404 pages
13. 404 Sessions are added to Sessions table and 404 Page tables
14. Unaudited Sessions with 404 pages are retrieved.
15. Sessions are added for Audit processing.

Figure 12:
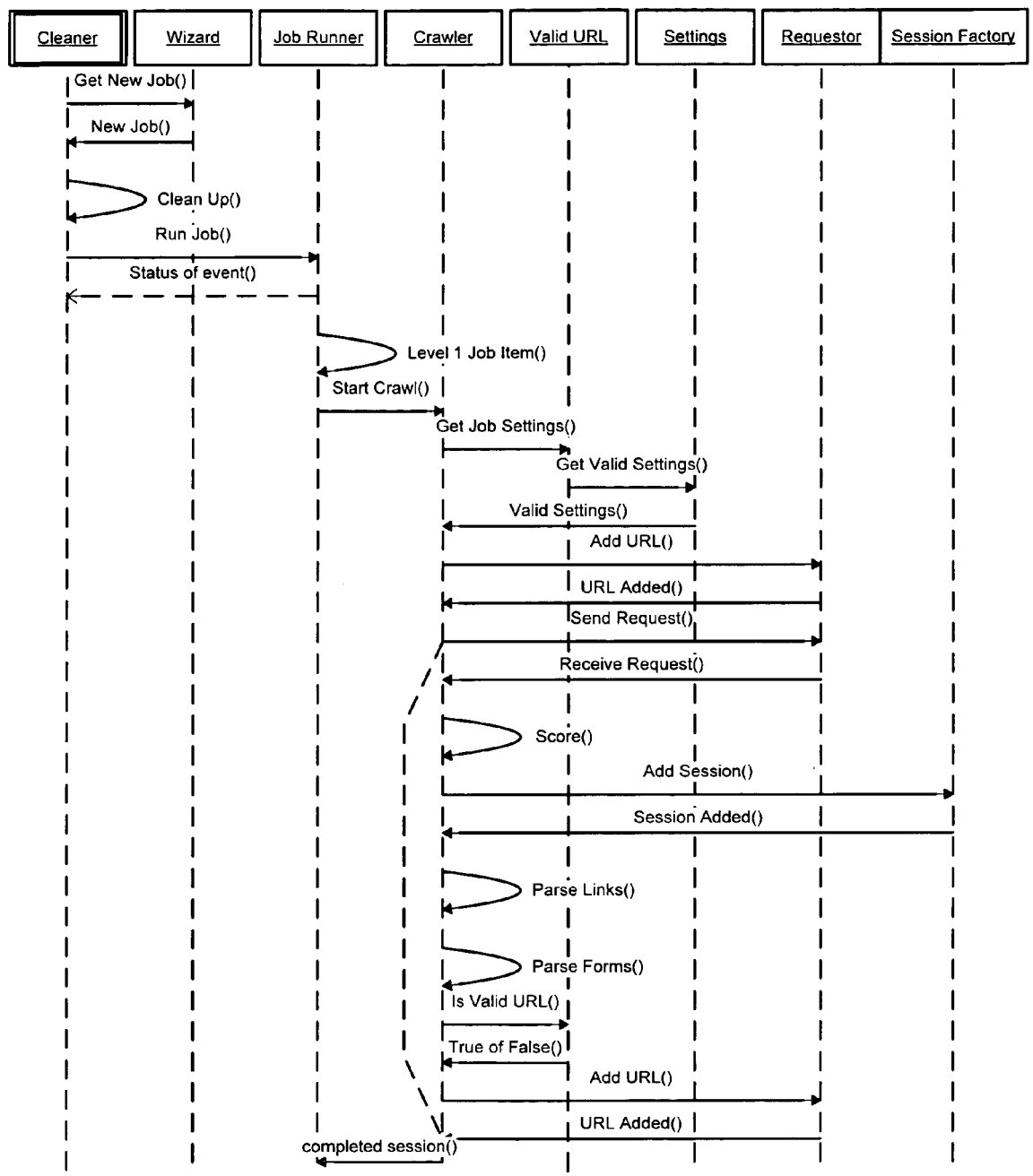
FIG. 12 is a sequence diagram illustrating an embodiment of a crawling process which may be implemented by the web application assessment system of FIG. 11.

The web application assessment tool may be used to discover and analyze web applications 104. A sequence diagram for an exemplary crawling process is shown in FIG. 12. The Wizard creates a job. A job creates one or more job items. A job Item has settings and a policy. This process is the same for Web discovery or a Single URL. Cleaner cleans up old jobs when a new job begins. The Job Runner is responsible for the job which may include multiple job items. It raises events and manages them specific to the job item. When a crawl is started, it is passed the host and job item information. The crawler requests session server types from the database. Valid URLs are kept in memory. This is to speed up and manage what is valid and not. Global Search is certain words searched on every page. Every session needs to know its parent. Add sessions check for Server, New or updated host, scheme, port, and post.

One of ordinary skill in the art will appreciate that UIR 108 and user interaction playback module(s) 110 may be implemented in software, hardware, firmware, or a combination thereof. Accordingly, in one embodiment, UIR 108 and user interaction playback module(s) 110 is implemented in software or firmware that is stored in a memory and that is executed by a suitable instruction execution system. In hardware embodiments, UIR 108 and user interaction playback module(s) 110 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks in FIGS. 1-12 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, UIR 108 and user interaction playback module(s) 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes various embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for performing a vulnerability assessment of a computer application that is accessible through a network as a web application by monitoring user interactions with the computer application through a network application and storing at least portions of the user interactions for playback during a vulnerability assessment, the method comprising the steps of:
    invoking a network application used to interact with the computer application through the use of a plurality of winsocks;
    searching the network application to discover where at least some of the plurality of winsocks reside in memory;
    setting a breakpoint at the start of at least one of the of the discovered winsocks;
    detecting the occurrence of hitting breakpoints as the result of user interactions with the web application through the network application;
    in response to each detection of hitting a breakpoint:
        suspending operation of the network application;
        probing the network application to obtain data identifying the user interactions with a web application;
        recording the obtained data as recorded interactions; and
        resuming operation of the network application; and
    playing back the user interactions to simulate a user interacting with the computer application through the network application, to perform a vulnerability assessment of the web application using the recorded interactions.

2. The method of claim 1, wherein the step of detecting the occurrence of hitting breakpoints further comprises employing an operating system API to monitor user interactions via the browser.

3. The method of claim 2, wherein the operating system API comprises a debugging functionality.

4. The method of claim 1, wherein the step of playing back the user interactions to perform a vulnerability assessment of the web application comprises:
    allowing recorded user interactions of the computer application to be selected; simulating the network application interacting with the computer application by replaying the selected user interactions in various scenarios to perform a vulnerability assessment of the computer application to the user interactions.

5. The method of claim 1, further comprising:
    receiving a request to commence the recording of user interactions;
    recording an authentication procedure used to establish an authenticated connection with the web application; and
    receiving a request to stop the recording of user interactions.

6. The method of claim 5, further comprising:
    determining when an authenticated connection has been lost; and
    automatically replaying the authentication procedure to re-establish connection with the computer application.

7. A vulnerability assessment system for assessing the vulnerability of computer applications available over a network as web application, the system comprising:
    a user interaction recorder for capturing interactions between a browser and a web application and storing the interactions into a storage device for future playback, the user interaction recorder being configured to invoke a network application to interact with the computer application, probe the network application to identify the memory location of a plurality of functions used to interface with the computer application over the network, setting breakpoints at one or more of the identified functions so as to allow the user interaction recorder to assume control over the network application when user interaction with the network application results in triggering a breakpoint, further probe the network application to record data of user interactions, and return control to the network application; and a processor running a playback tool for selectively accessing the recorded data of user interactions in the storage device and automatically repeating at least a subset of the recorded user interactions by simulating a user interacting with the computer application with the recorded interactions for performing a vulnerability assessment of the computer application using the previously recorded user interactions.

8. The web application assessment system of claim 7, wherein the user interaction recorder comprises a socket recorder that operates to set breakpoints upon the invocation of a winsock.

9. The vulnerability assessment system of claim 8, wherein the socket recorder comprises an operating system debug functionality.

10. The vulnerability assessment system of claim 7, wherein the user interaction recorder comprises a network proxy.

11. The vulnerability assessment system of claim 7, wherein the playback tool interfaces with an assessment agent for performing a vulnerability assessment of the computer application.

12. The vulnerability assessment system of claim 7, wherein the playback tool automatically repeats the recorded interactions for performing a security assessment of the web application.

13. The vulnerability assessment system of claim 7, wherein the user interaction recorder comprises a browser plug-in.

14. The vulnerability assessment system of claim 7, wherein the user interaction recorder comprises an interactive user menu configured to enable a user to specify when the user interaction recorder records user interactions.

15. The vulnerability assessment system of claim 7, further comprising a database of recorded user interactions.

16. The vulnerability assessment system of claim 7, wherein the user interaction recorder records an authentication procedure used to establish an authenticated connection with the computer application.

17. The vulnerability assessment system of claim 16, wherein the playback tool is configured to determine when the authenticated connection has been lost and automatically replay the authentication procedure to re-establish the authenticated connection with the web application.

18. A computer application vulnerability assessment system comprising:

means for invoking a network application for interacting with the computer application so that a recording of the user interactions can be captured and stored, the network application being invoked by a user interaction recorder that sets breakpoints at strategic points to detect desired user interactions and to suspend the operation of the network application while recording data indicative of the user interactions; and means for selectively and automatically retrieving and repeating various portions of the captured user interactions for performing a vulnerability assessment of the computer application.

19. A web application vulnerability assessment system comprising:

a user interaction recorder that invokes and interfaces with a web browser to capture interactions between the web browser and a web application being accessed by the web browser and stores the interactions into a memory storage device, the user interaction recorder interfacing to the web browser by identifying various functions of the web browser that result in network accesses to the web application, setting breakpoints to be triggered upon invoking one or more of these various functions and invoking a debug application to capture the breakpoints and provide control to the user interaction recorder to detect and record user interactions that resulted in invoking the functions; and a processor executing a web application assessment agent that can access the recorded user interactions in the memory storage device as input for conducting a vulnerability assessment of the web application.

20. The web application vulnerability assessment system of claim 19, wherein the recorder comprises a browser plug-in.

21. The web application vulnerability assessment system of claim 19, wherein the recorder comprises a socket.

* * * * *

UNITED STATES PATENT AND TRADEMARK OFFICE
CERTIFICATE OF CORRECTION

PATENT NO. : 7,647,631 B2  Page 1 of 1
APPLICATION NO. : 11/007713
DATED : January 12, 2010
INVENTOR(S) : Caleb Sima It is certified that error appears in the above-identified patent and that said Letters Patent is hereby corrected as shown below:

In column 10, line 18, in Claim 1, after "of the" delete "of the".

In column 10, line 57, in Claim 6, delete "lost; and" and insert -- lost between the network application and the computer application during a vulnerability assessment; and --, therefor.

Signed and Sealed this

Thirteenth Day of July, 2010

David J. Kappos
*Director of the United States Patent and Trademark Office*